(12) United States Patent
Crews

(10) Patent No.: US 7,655,603 B2
(45) Date of Patent: Feb. 2, 2010

(54) CLEAN-UP ADDITIVE FOR VISCOELASTIC SURFACTANT BASED FLUIDS

(75) Inventor: James B. Crews, Willis, TX (US)

(73) Assignee: Baker Hughes Incorported, Houston, TX (US)

( * ) Notice: Subject to any disclaimer, the term of this patent is extended or adjusted under 35 U.S.C. 154(b) by 389 days.

(21) Appl. No.: 11/430,655

(22) Filed: May 9, 2006

(65) Prior Publication Data

US 2006/0258541 A1 Nov. 16, 2006

Related U.S. Application Data

(60) Provisional application No. 60/680,572, filed on May 13, 2005.

(51) Int. Cl.
  *C09K 8/68* (2006.01)
  *E21B 43/22* (2006.01)
(52) U.S. Cl. .............. 507/203; 507/200; 166/305.1
(58) Field of Classification Search .......... 507/203, 507/200
  See application file for complete search history.

(56) References Cited

U.S. PATENT DOCUMENTS

| | | | | |
|---|---|---|---|---|
| 2,290,415 | A | * | 7/1942 | De Groote ............ 507/246 |
| 2,363,048 | A | * | 11/1944 | Keiser et al. ............ 554/58 |
| 3,504,744 | A | | 4/1970 | Davis et al. |
| 3,710,865 | A | | 1/1973 | Kiel |
| 3,721,633 | A | | 3/1973 | Ranauto |
| 3,808,311 | A | | 4/1974 | Olson, Jr. et al. |
| 4,123,395 | A | | 10/1978 | Maguire, Jr. et al. |
| 4,154,706 | A | | 5/1979 | Kenkare et al. |
| 4,396,520 | A | | 8/1983 | Payne et al. |
| 4,447,344 | A | | 5/1984 | Roe |
| 4,663,069 | A | | 5/1987 | Llenado |
| 5,759,409 | A | | 6/1998 | Knauf et al. |
| 6,001,795 | A | * | 12/1999 | Charlez et al. ............ 510/365 |
| 6,348,509 | B1 | | 2/2002 | Reeve |
| 6,613,720 | B1 | | 9/2003 | Feraud et al. |
| 6,672,388 | B2 | | 1/2004 | McGregor et al. |
| 6,855,260 | B1 | | 2/2005 | Yoon |
| 6,881,709 | B2 | | 4/2005 | Nelson et al. |
| 6,887,839 | B2 | | 5/2005 | Smith et al. |
| 6,908,888 | B2 | | 6/2005 | Lee et al. |
| 7,084,095 | B2 | | 8/2006 | Lee et al. |
| 7,216,709 | B2 | * | 5/2007 | McElfresh et al. ............ 166/300 |
| 7,380,606 | B2 | * | 6/2008 | Pursley et al. ............ 166/305.1 |
| 2001/0036905 | A1 | | 11/2001 | Parlar et al. |
| 2003/0166472 | A1 | | 9/2003 | Pursley et al. |
| 2006/0041028 | A1 | | 2/2006 | Crews |

FOREIGN PATENT DOCUMENTS

GB         1388909        3/1975

OTHER PUBLICATIONS

J. Paktinat, et al., "Microemulsion Reduces Adsorption and Emulsion Tendencies in Bradford and Speechley Sandstone Formations," 2005 SPE International Symposium on Oilfield Chemistry, Feb. 2-4, 2005, SPE 93270, Houston, TX, USA.
G. Penny, et al., "The Application of Microemulsion Additives in Drilling and Stimulation Results in Enhanced Gas Production," 2005 SPE Production and Operations Symposium, Apr. 17-19, 2005, SPE 93270, Oklahoma City, OK, USA.
Baker Hughes [Internet], "Drilling Fluid and Stimulation Additives: Demulsifiers: Oxyalkylated Phenolic Resins," [cited May 5, 2005] Available from: http://www.bakerhughes.com/bakerpetrolite/drilling_stimulation/intermediates/demulsifiers/Oxyalkylated_Phenolic_Resins/htm.
Baker Hughes [Internet], "Drilling Fluid and Stimulation Additives: Demulsifiers: Polyol Esters," [cited May 5, 2005] Available from: http://www.bakerhughes.com/bakerpetrolite/drilling_stimulation/intermediates/demulsifiers/Polyol_Esters/htm.
PCT International Search Report for PCT International Application No. PCT/US2006/018815, Sep. 25, 2006.

* cited by examiner

Primary Examiner—Timothy J. Kugel
Assistant Examiner—Atnaf Admasu
(74) Attorney, Agent, or Firm—Mossman Kumar & Tyler PC

(57) ABSTRACT

Clean-up additive compositions may be used to enhance the clean-up of VES-gelled aqueous fluids in a wide range of applications and VES fluid compositions, including use of an internal breaker system. The compositions are microemulsions that may include, but not necessarily be limited to, at least one viscosity reducing agent, at least one solubilizing agent, at least one desorption agent and at least one water wetting agent. One non-limiting embodiment of a specific microemulsion includes an unsaturated fatty acid oil, a glycol, a sorbitan ester/ethoxylated sorbitan ester mixture, and an alkyl sulfonate. Microemulsions may perform one or more of the following functions: keeping the reservoir water wet; keeping surface tension reduction low; demulsifying reservoir crude oils and aqueous VES fluids; dispersing and solubilizing the by-products generated when breaking the VES gel; and/or limiting the amount of VES residue on reservoir minerals.

23 Claims, No Drawings

CLEAN-UP ADDITIVE FOR VISCOELASTIC SURFACTANT BASED FLUIDS

CROSS-REFERENCE TO RELATED APPLICATION

This application claims the benefit of U.S. Provisional Application No. 60/680,572 filed May 13, 2005.

TECHNICAL FIELD

The present invention relates to gelled treatment fluids used during hydrocarbon recovery operations, and more particularly relates, in one embodiment, to methods of "cleaning-up" or removing the aqueous treatment fluids containing viscoelastic surfactant gelling agents used during hydrocarbon recovery operations.

BACKGROUND

One of the primary methods for well stimulation in the production of hydrocarbons is hydraulic fracturing. Hydraulic fracturing is a method of using pump rate and hydraulic pressure to fracture or crack a subterranean formation. Once the crack or cracks are made, high permeability proppant, relative to the formation permeability, is pumped into the fracture to prop open the crack. When the applied pump rates and pressures are reduced or removed from the formation, the crack or fracture cannot close or heal completely because the high permeability proppant keeps the crack open. The propped crack or fracture provides a high permeability path connecting the producing wellbore to a larger formation area to enhance the production of hydrocarbons.

The development of suitable fracturing fluids is a complex art because the fluids must simultaneously meet a number of conditions. For example, they must be stable at high temperatures and/or high pump rates and shear rates that can cause the fluids to degrade and prematurely settle out the proppant before the fracturing operation is complete. Various fluids have been developed, but most commercially used fracturing fluids are aqueous based liquids that have either been gelled or foamed. When the fluids are gelled, typically a polymeric gelling agent, such as a solvatable polysaccharide, for example guar and derivatized guar polysaccharides, is used. The thickened or gelled fluid helps keep the proppants within the fluid. Gelling can be accomplished or improved by the use of crosslinking agents or crosslinkers that promote crosslinking of the polymers together, thereby increasing the viscosity of the fluid. One of the more common crosslinked polymeric fluids is borate crosslinked guar.

The recovery of fracturing fluids may be accomplished by reducing the viscosity of the fluid to a low value so that it may flow naturally from the formation under the influence of formation fluids. Crosslinked gels generally require viscosity breakers to be injected to reduce the viscosity or "break" the gel. Enzymes, oxidizers, and acids are known polymer viscosity breakers. Enzymes are effective within a pH range, typically a 2.0 to 10.0 range, with increasing activity as the pH is lowered towards neutral from a pH of 10.0. Most conventional borate crosslinked fracturing fluids and breakers are designed from a fixed high crosslinked fluid pH value at ambient temperature and/or reservoir temperature. Optimizing the pH for a borate crosslinked gel is important to achieve proper crosslink stability and controlled enzyme breaker activity.

While polymers have been used in the past as gelling agents in fracturing fluids to carry or suspend solid particles as noted, such polymers require separate breaker compositions to be injected to reduce the viscosity. Further, such polymers tend to leave a coating on the proppant and a filter cake of dehydrated polymer on the fracture face even after the gelled fluid is broken. The coating and/or the filter cake may interfere with the functioning of the proppant. Studies have also shown that "fish-eyes" and/or "microgels" present in some polymer gelled carrier fluids will plug pore throats, leading to impaired leakoff and causing formation damage.

Recently it has been discovered that aqueous drilling and treating fluids may be gelled or have their viscosity increased by the use of non-polymeric viscoelastic surfactants (VES). These VES materials are advantageous over the use of polymer gelling agents, since they are low molecular weight surfactants, in that they are less damaging to the formation, without a fluid-loss additive present leave no filter cake on the formation face, leave very little coating on the proppant, and do not create microgels or "fish-eyes". Progress has also been made toward developing internal breaker systems for the non-polymeric VES-based gelled fluids, that is, breaker systems that use products that are incorporated and solubilized within the VES-gelled fluid that are activated by downhole conditions that will allow a controlled rate of gel viscosity reduction over a rather short period of time of 1 to 4 hours or so, similar to gel break times common for conventional crosslinked polymeric fluid systems.

Furthermore, although VES-gelled fluids are an improvement over polymer-gelled fluids from the perspective of being easier to clean up the residual gel materials after the fluid viscosity is broken and the fluid produced or flowed back, improvements need to be made in cleaning-up from operations employing VES-gelled fluids.

It would be desirable if clean-up methods could be devised to more completely and easily remove well completion fluids gelled with and composed of viscoelastic surfactants, particularly the remnants or deposits left by such fluids.

SUMMARY

There is provided, in one non-restrictive form, a method for treating a subterranean reservoir that involves pumping an aqueous fluid gelled with a viscoelastic surfactant (VES) into the subterranean reservoir; and pumping a microemulsion into the subterranean reservoir either before, after, and/or simultaneously with pumping the VES-gelled aqueous fluid into the subterranean reservoir.

In another non-limiting embodiment, the method improves an improved property of the hydrocarbon recovery process. The improved property is a consequence of the presence of the microemulsion being introduced into the formation before, after and/or simultaneously with introducing the VES-gelled fluid into the subterranean reservoir as compared to or in contrast to an identical method absent the microemulsion. Examples of properties that may be improved include, but are not necessarily limited to, VES-gelled aqueous fluid clean-up, increased rate and/or increased total amount of VES returned from the reservoir, reducing plating out of the VES molecules onto reservoir minerals, keeping the reservoir pore matrix minerals water wet, lowering the surface tension between water and the reservoir pore matrix minerals, preventing or removing water-blocks, preventing or correcting VES fluid incompatibility with reservoir crude oil, leak-off control of VES-gelled fluids into the reservoir, water solubility of VES molecules, water solubility and/or dispersability of altered VES molecules, and combinations thereof.

Further in a different embodiment, the methods and compositions herein involve an aqueous fluid that includes water;

at least one viscoelastic surfactant (VES) in an amount effective to increase the viscosity of the aqueous fluid and a microemulsion. In another non-limiting embodiment, the microemulsion includes, but is not necessarily limited to, at least one viscosity reducing agent, at least one solubilizing agent, at least one desorption agent, and at least one water wetting agent.

In an alternate non-restrictive embodiment, the microemulsion includes, but is not necessarily limited to, a viscosity reducing agent that may include at least one unsaturated fatty acid, a solubilizing agent that may include a solvent, a desorption agent that may include a surfactant, and a water wetting agent that may include a co-surfactant.

Alternatively, in another version the microemulsion incorporates a solvent that further may include, but is not necessarily limited to, alcohol, glycol, glycol ether, alkyl esters, and combinations thereof; a surfactant that may include, but is not necessarily limited to, an alkyl glucoside, an alkyl polysaccharide, an alkoxylated sorbitan ester, a sorbitan ester, and combinations thereof, and a co-surfactant that may include, but is not necessarily limited to, an isethionate, an alpha olefin sulfonate, an alkyl sulfonate, an alkyl ether sulfonate, an alkyl aromatic sulfonate, and combinations thereof.

Optional components of the microemulsion may include, but are not necessarily limited to, dispersing agents, autooxidation rate controllers, water hardness agents, demulsifier agents, and combinations thereof. The dispersing agent may further include a co-solvent, and the water hardness agent may further include a chelant.

In a more specific but still non-restrictive, alternate embodiment, in the microemulsion the co-solvent may include alkyl pyrrolidones, alkyl carbonates, terpene, d-limonene, and combinations thereof, the autooxidation rate controller may include, but is not necessarily limited to, tocopherols, ascorbates, chloride salts, bromide salts, trienoics, pentaenoics, hexaenoics, chelated trace metals, unchelated trace metals, and combinations thereof, the chelant may include, but is not necessarily limited to, polyaspartates, iminodisuccinates, aminocarboxylic acids, organophosphates, polyacrylamides, and combinations thereof, and the demulsifier agent may include, but is not necessarily limited to, polymers with hydrophobic side groups attached to a hydrophilic polymer backbone, alkylated phenolic resins, polyol esters, and combinations thereof.

The VES-gelled aqueous fluids herein may further include a breaker system. One non-limiting breaker system includes a composition in an amount effective to reduce the viscosity of the gelled aqueous fluid, where the composition includes, but is not necessarily limited to, at least one metal ion source; and at least second source that may include, but is not necessarily limited to, an organic redox agent source, an inorganic redox agent source, an organic hydrogenation-dehydrogenation source, and an inorganic hydrogenation-dehydrogenation source. Another non-restrictive breaker system includes a soap reaction product of a fatty acid with an alkali or alkali earth metal base, where the soap reaction product is present in an amount effective to reduce the viscosity of the gelled aqueous fluid. A different, alternative breaker system includes an unsaturated fatty acid, where the method further includes heating the fluid to a temperature effective to cause the unsaturated fatty acid to produce products in an amount effective to reduce the viscosity of the gelled aqueous fluid.

DETAILED DESCRIPTION

It has been discovered that a clean-up additive composition may be used to aid removal of VES-gelled fluids from the reservoir once a treatment is completed. The additive may be used for cleaning up regular VES fluid systems or as a synergistic clean-up aid with the Diamond FRAQ™ breaker systems available from Baker Oil Tools of Baker Hughes Incorporated. The additive may also be used to improve other internal VES breaker systems. Generally, the use of the microemulsion product will help perform the following functions: keep the subterranean reservoir water wet; keep surface tension reduction low; work as a demulsifier with reservoir crude oils and the VES fluids; help disperse and solubilize the by-products generated when VES gels are broken; and limit amount of VES residue on reservoir minerals, thus aiding clean-up. Prior to this point only expensive pre- and post-flush fluids have been used for the above described functions. A product added to the gel during mixing and injection has now been found to be needed in many VES applications and downhole reservoir conditions. A component added to the VES-gelled fluid that is pumped downhole is termed an "internal clean-up" additive herein. While the clean-up additives herein may be internal, they are not necessarily limited to this method of delivery. They may also be pumped downhole or injected before and/or after the VES-gelled fluid is pumped or injected alternatively from or in addition to including the additive internally.

More particularly, it has been discovered that a clean-up additive with a modifiable composition may be used to aid the removal of VES fluids from the reservoir once a treatment is completed. By "modifiable" it is meant that the clean-up additive may have its components and proportion of components changed to fit a particular application, VES-gelled fluid, or hydrocarbon and/or conditions encountered in the subterranean formation. The additive may be used for cleaning up regular VES-gelled fluid systems and as a synergistic clean-up aid with the Diamond FRAQ™ breaker systems available from Baker Oil Tools. In particular, the clean-up additives and methods discussed herein may be used with Metal Ion-Redox breaker systems, Saponification breaker systems, and Polyenoic breaker system. Metal Ion-Redox breaker systems involve the use of at least one metal ion source; and at least one second source that may include, but is not necessarily limited to, an organic redox agent source, an inorganic redox agent source, an organic hydrogenation-dehydrogenation source, and an inorganic hydrogenation-dehydrogenation source, such as described in U.S. Patent Application Publication No. 2006/0041028 A1. Saponification breaker systems involve the use of a soap reaction product of a fatty acid with an alkali or alkali earth metal base such as described in U.S. patent application Ser. No. 11/372,624. Polyenoic breaker systems involve an unsaturated fatty acid (e.g. a polyenoic acid), further comprising heating the fluid to a temperature effective to cause the unsaturated fatty acid to produce products in an amount effective to reduce the viscosity of the gelled aqueous fluid such as described in U.S. patent application Ser. No. 11/373,044. In one non-limiting embodiment, the unsaturated fatty acid used as part of a polyenoic breaker system is different from the unsaturated fatty acid used as the viscosity reducing agent. All of these applications are incorporated by reference herein.

The use of the clean-up additives and methods described herein will aid in one or more of the following functions and processes: subterranean reservoir water wetting (keep the VES from oil wetting the reservoir minerals), surface tension reduction (aid the ease of flowback of the fluid and prevent potential water-blocks), demulsification (prevent emulsification or break emulsions between the reservoir crude oil and the VES-laden aqueous fluid), dispersing and solubilizing the by-products generated when VES-gelled aqueous fluids are broken, and/or limiting the amount of VES residue on the reservoir minerals (i.e. limiting the amount of VES plating out onto the reservoir or enhance rate of VES desorption). Prior to the clean-up fluids and methods herein the only clean-up technology for VES fluids has been the use of pre- and post-flush fluids for one or more of the above described functions. The microemulsion clean-up additives herein may be added to the gel during mixing and pumping downhole.

There has developed a need for this type of chemical preventative and remediation technology. There are treatment cases that show problems with VES gel clean-up after a treatment, such as where the VES treatment fluid does not readily or completely flow back during reservoir production. To this point common use of expensive pre-flush and post-flush VES clean-up fluids have been used or remedial VES clean-up fluids have been used when flowback shows reservoir impairment after a VES treatment.

Microemulsions are clear, isotropic liquid mixtures of oil, water and surfactant and co-surfactant (different from the surfactant). The co-surfactant is often a 4 to 8 carbon chain aliphatic alcohol, such as pentanol, and the water may contain salt(s). In contrast to ordinary emulsions, microemulsions form upon simple mixing of the components and do not require high shear conditions. In the context of the clean-up additives and methods herein, it is not necessary that the microemulsions be clear or transparent: for oil-in-water microemulsion formulations it is not necessary that the oil is completely solubilized in the water, that is, it is permissible where only a portion or even all of the oil is dispersed within the water phase; and for water-in-oil microemulsion formulations it is not necessary that the water be nanometer-diameter droplets (i.e. approximately one-twentieth of the wavelength of visible light for transparency) within the continuous oil phase, that is, it is permissible where only a portion or even all of the water is dispersed as micrometer-diameter or greater droplets within the oil phase.

One non-limiting embodiment of the microemulsion useful in the methods described herein has the following components:
1. At least one viscosity reducing agent;
2. At least one solubilizing agent;
3. At least one desorption agent; and
4. At least one water wetting agent.

and the following optional components:
    a. dispersing agent,
    b. autooxidation rate controller,
    c. water hardness agent, and/or
    d. demulsifier agent.

In a more specific non-restrictive embodiment, the microemulsion may have the following components, which correspond to those of the list above, respectively:
1. At least one unsaturated fatty acid;
2. At least one solvent;
3. At least one surfactant; and
4. At least one co-surfactant.

and the following optional components:
    a. co-solvent,
    b. autooxidation rate controller,
    c. chelants, and/or
    d. demulsifier.

It should be noted that the surfactants and co-surfactants that comprise the microemulsion are different from and are not the same as the viscoelastic surfactants (VESs).

The chemistry of the compositions and methods herein and the various suitable components will now be discussed in more detail.

With respect to the viscosity reducing agents, which may be unsaturated fatty acids (UFA), suitable UFAs may include, but are not necessarily limited to, olive oil, canola oil, flax oil, corn oil, soybean oil, borage oil, cod liver oil, salmon oil, nutritional oil blends (such as Fish Oil 18:12TG from Bioriginal Food & Science Corp.), and the like, and combinations thereof. These viscosity reducing agents may be also referred to and understood as autooxidation agents in that they will autooxidize into products that will reduce the viscosity of the VES-gelled aqueous fluids. As will be discussed later, autooxidation controllers will either slow down or speed up the rate of autooxidation of these unsaturated fatty acid viscosity reducing breaking agents by affecting the autooxidation rate and/or the autooxidation pathway of the unsaturated fatty acids.

1. Select UFA oils may initially improve VES-gelled fluid leak-off control by inducing biphase (water-oil) flow into reservoir pore matrix.
    2. Select UFA oils will autooxidize into VES-gel breaking products including, but not necessarily limited to, aldehydes, ketones, and the like. Autooxidation generated products are abbreviated herein as AOGP.
    3. AOGPs will reduce VES-gel viscosity and have the following effects:
        a. They will disturb and/or alter VES micelle structure, thus breaking the gel.
        b. This viscosity reduction will allow easier clean-up of the VES treatment fluid from the reservoir.

With respect to the solubilizing agent, e.g. solvent, particularly an organic solvent, non-restrictive examples are alcohols (e.g. methanol, ethanol, isopropanol, butanol, and the like), glycols (e.g. propylene glycol (MPG), dipropylene glycol (DPG), tripropylene glycol (TPG), ethylene glycol (MEG), diethylene glycol (DEG), and the like), glycol ethers (e.g. ethylene glycol monomethyl ether (EGMME)), ethylene glycol monoethyl ether (EGMEE), ethylene glycol monopropyl ether (EGMPE), ethylene glycol monobutyl ether (EGMBE), ethylene glycol monomethyl ether acetate (EGMMEA), ethylene glycol monoethyl ether acetate (EGMEEA acetate) and the like) and alkyl esters (e.g. methyl formate, ethyl formate, methyl acetate, ethyl acetate, butyl acetate, methyl propionate, ethyl propionate, ethyl butyrate, methyl benzoate, ethyl benzoate, methylethyl benzoate, and the like), and combinations thereof. The solubilizing agent is expected to perform most or all of the following functions:
    1. Aid dispersion of the viscosity reducer (e.g. UFA) and co-solvent components.
    2. Aid AOGP solubility and dispersability.
    3. Help prevent emulsions between the VES fluid and the reservoir crude oil or other hydrocarbons.
    4. Aid desorption of VES molecules from reservoir pore matrix minerals.
    5. Aid lowering of surface tension between water-reservoir pore matrix minerals to:
        a. Aid treatment fluid recovery (flow-back) and
        b. Help prevent water block (due to high water absorption-saturation).

With respect to the desorption agent, a number of surfactants may be employed, including, but not necessarily limited to, alkoxylated alcohols, particularly ethoxylated alcohols; alkyl glucosides; alkyl polysaccharides; mixtures of alkyl glucoside and alkyl polysaccharide; sorbitan esters; alkoxylated sorbitan esters; and the like. In such mixtures, the ratio of alkyl glucoside to alkyl polysaccharide ranges from about 1:2 to about 1:10 vol %. Other combinations and ratios of desorption agents may be utilized. Unless otherwise noted, the term "alkyl" herein is defined as straight or branched lower alkyl groups of 1 to 18 carbon atoms. The surfactant is expected to perform most or all of the following functions:

1. Aid dispersion of solvent and co-solvent components.
2. Aid solubility and dispersability of co-surfactant component(s).
3. Help prevent emulsions between the VES fluid and the reservoir crude oil or other hydrocarbons.
4. Aid desorption of VES molecules from the reservoir pore matrix minerals.
5. Aid water wetting and prevent oil wetting of the reservoir matrix minerals.
6. Aid lowering of surface tension between aqueous fluids and the reservoir pore matrix minerals to:
    a. Aid treatment fluid recovery (flow-back) and
    b. Help prevent water block (due to high water absorption-saturation).

With respect to the water wetting agent, which may be a co-surfactant, a number of co-surfactants may be employed, including, but not necessarily limited to, one of or a mixture of an isethionate, a sulfosuccinate, an alpha olefin sulfonate, an alkyl sulfate, an alkyl sulfonate, an alkyl ether sulfate, an alkyl ether sulfonate, an alkyl aromatic sulfonate. For one non-limiting example a mixture of alkyl sulfate and alkyl aromatic sulfonate, and the like. In such mixtures, the ratio of alkyl sulfate to alkyl aromatic sulfonate ranges from about 1:2 to about 1:20 vol %. Unless otherwise noted, the term "aromatic" herein is defined as having one or more aromatic groups. It should be understood that the water wetting agent (e.g. co-surfactant) is different from the solubilizing agent and the desorption agent. The co-surfactant is expected to perform most or all of the following functions:

1. Aid dispersion of UFA, solvent and co-solvent components present.
2. Help prevent emulsions between the VES fluid and the reservoir crude oil or other hydrocarbons.
3. Aid desorption of VES molecules from the reservoir pore matrix minerals.
4. Aid lowering of surface tension between the water-reservoir pore matrix minerals to:
    a. Aid treatment fluid recovery (flow-back) and
    b. Help prevent water block (due to high water absorption-saturation).

With respect to some of the optional components of the microemulsion, in one non-limiting embodiment a suitable co-solvent may include, but is not limited to, one of or a mixture of terpene, d-limonene, methylpyrrolidone, propylene carbonate, and the like. As used herein, the co-solvent is a different compound from the solvent or the solubilizing agent. The co-solvent is expected to perform most or all of the following functions:

1. Aid initial dispersion of UFA.
2. Aid crude oil compatibility.
3. Aid AOGP solubility and dispersability.
4. Aid in dispersion of altered VES molecules (such as those resulting from metal ion-redox or other breaking systems and mechanisms).
5. Aid in dispersion of breaker system-generated compounds that degrade VES micelle structure (saponification or other breaking systems).

The optional component autoxidation rate controllers perform the functions of affecting the autooxidation rate and/or the autooxidation pathway of the unsaturated fatty acids (i.e. viscosity reducing agents). That is, autooxidation rate controllers change (speed up or slow down) the rate at which autooxidation occurs. In particular, the autooxidation rate controllers modify the behavior of the viscosity reducing agents and thus may help control the rate of autooxidation of the UFAs over the range from about 80° F. to about 280° F. (about 27° C. to about 138° C.).

1. Tocopherols, ascorbates, erythorbates, chloride salts (NaCl, KCl, $CaCl_2$, $MgCl_2$, and the like), bromide salts (NaBr, $CaBr_2$, and the like), and other halide salts may slow the autooxidation rate of UFAs by slowing down the reaction rate at elevated temperatures.
2. Trienoic fatty acids, pentaenoic fatty acids, hexaenoic fatty acids, trace metals (in unchelated form; such as Fe, Cu, Cr, Co, Mo, Pd, Mn, Zn in chloride form, and the like) and chelated trace metals like ethylenediaminetetraacetic acid (EDTA) complexed with metal ions including, but are not necessarily limited to, $Cu^{+2}$, $Ni^{+2}$, $Mn^{+2}$, $Co^{+2}$, $Fe^{+2}$, $Fe^{+3}$ and the like may increase the rates of autooxidation and the autooxidation pathways of UFAs by:
    a. Increasing the rate of autooxidation at lower temperatures, and
    b. Helping control autooxidation-hydroperoxide degradation pathways.
    In one non-limiting embodiment, the unsaturated fatty acids in the above list for autooxidation rate controllers are relatively more unsaturated than the UFAs used herein as viscosity reducing agents.

Optional water hardness agents, particularly chelants may include, but are not necessarily limited to, polyaspartates, iminodisuccinates, aminocarboxylic acids, organophosphates, and polymers (e.g. polyacrylamides). Several of the water hardness agents have been found to influence the UFA breaking agents, mainly by slowing down the rate of autoxidation. These water hardness agents may function by:
    a. Complexing cationic ions from the formation brine, and
    b. Enhancing the performance of the surfactant and/or co-surfactant components.

With respect to the optional demulsifier, a number of possibilities may be employed, including, but are not necessarily limited to:
1. Polymeric-based demulsifiers, which may include, but are not necessarily limited to, polymers with hydrophobic side groups attached to a hydrophilic polymer backbone;
2. Resin-based demulsifiers, which may include, but are not necessarily limited to, alkylated phenolic resins; and
3. Polyol-based demulsifiers, which may include, but are not necessarily limited to, polyol esters.

The optional demulsifiers function to prevent and/or break emulsions between the VES fluid and the reservoir crude oil or other hydrocarbon.

In one non-limiting embodiment of the invention, the microemulsions may have the proportions shown in Table I.

TABLE I

Proportions of Microemulsion Components

| Component | Proportion | Optional Proportion |
|---|---|---|
| Viscosity reducer agent(s) | 1 to 97 vol % | 2 to 80 vol % |
| Solubilizing agent(s) | 2 to 60 vol % | 4 to 40 vol % |
| Desorption agent(s) | 0.5 to 30 vol % | 2 to 16 vol % |
| Water wetting agent(s) | 0.5 to 40 vol % | 2 to 25 vol % |

TABLE I-continued

Proportions of Microemulsion Components

| Component | Proportion | Optional Proportion |
|---|---|---|
| Optional dispersing agent(s) | 0 to 50 vol % | 0 to 30 vol % |
| Optional autooxidation rate controller(s) | 0 to 15 vol % | 0 to 5 vol % |
| Optional water hardness agent(s) | 0 to 12 vol % | 0 to 4 vol % |
| Optional demulsifier agent(s) | 0 to 20 vol % | 0 to 8 vol % |

It will be appreciated that in general the microemulsions herein are water-in-oil emulsions using oils that at concentrations recommended are compatible with the VES-gelled aqueous fluids. The active part per se of the clean-up additive will be oil-based in one non-limiting embodiment. Once the additive is placed within, introduced into or mixed with the VES-based treatment fluid most of the components will initially associate with the VES surfactant head group or tail group and become part of the VES micelle, and by such association would then act as an oil-in-water microemulsion. In one non-limiting embodiment the microemulsion and the VES-gelled aqueous fluid are substantially mixed by contacting each other within the reservoir, borehole and other subterranean regions. By "substantially mixed" is meant mixed sufficiently to accomplish one or more of the goals, applications, functions and purposes herein such as those listed below. Once the reservoir temperature allows autooxidation of the UFAs to occur, the AOGPs will then break down the VES-based microemulsion to a non-VES microemulsion (a spherical rather than elongated micelle structure), in one non-limiting explanation. The amount of microemulsion used in the non-restrictive embodiment where the microemulsion is mixed with the VES-gelled aqueous fluid may range from about 0.025 to about 2.0 vol % based on the total fluid volume, and in an alternate non-limiting embodiment the proportion may have a lower limit of about 0.05 and independently have an upper limit of about 1.2 vol %. No special mixing equipment or technique is needed to combine the microemulsion with the VES-gelled aqueous fluid.

The methods and compositions herein have a number of general applications and functions including, not necessarily limited to, the following:
1. Improving the clean-up (recovery) of VES-based treatment fluids.
2. Helping overcome many of the inherent limitations of VES fluids.
3. Helping overcome many of the incompatibilities of VES-based fluids with hydrocarbon bearing reservoirs.
4. Enhancing the effectiveness of breaker systems for VES-gelled fluids.
5. Improving the leak-off control of VES-based fluids.

In more detail, the useful applications for the methods and compositions herein include, but are not necessarily limited to, the following:
1. Improving VES-based treatment fluid recovery by lowering surface tension between the VES fluid and reservoir rock and also between the VES fluid and the reservoir crude oil.
2. Improving the rate and total amount of viscoelastic surfactants returned from the reservoir to the surface during reservoir production (by improving VES gel breaking and/or improving VES desorption).
3. Helping overcome much of the plating out of the VES molecules onto the reservoir minerals, which tends to promote oil-wetting of the reservoir. In one non-restrictive theory, the oil-wetting of the reservoir is believed to be caused by an abundance of hydrocarbon tails sticking up from the reservoir minerals that tend to repel water and attract oil.
4. Helping keep the reservoir pore matrix minerals water wet.
5. Helping lower the surface tension between the water and the reservoir pore matrix minerals to help prevent water blocks from occurring (e.g. due to high water absorption-saturation) for enhanced recovery of VES treatment fluid.
6. Helping prevent VES fluid incompatibility with the reservoir crude oil (or other hydrocarbon) and thus helping prevent viscous crude oil emulsions from forming.
7. Improving the leak-off control of VES-gelled fluids by promoting bi-phase flow into reservoir's porous media.
8. Enhancing the VES breaker systems by one or more of the following mechanisms, or by other mechanisms:
    a. Aiding water solubility of the VES molecules, that is, helping prevent phase separation of the viscoelastic surfactants from occurring due to one or more reservoir conditions including, but are not necessarily limited to, temperature, formation brine salinity, and the like.
    b. Aiding water solubility or dispersability of altered VES molecules that result from viscosity breaking, e.g. helping prevent altered surfactant phase separation from occurring due to one or more reservoir conditions.
    c. Aiding water solubility, dispersability, and/or the forming of producible microemulsions with the by-product compounds generated from degradation of viscoelastic surfactants or compounds generated from VES breaker products.

The VES that is useful in the present invention can be any of the VES systems that are familiar to those in the well service industry, and may include, but are not limited to, amines, amine salts, quaternary ammonium salts, amidoamine oxides, amine oxides, mixtures thereof and the like. Suitable amines, amine salts, quaternary ammonium salts, amidoamine oxides, and other surfactants are described in U.S. Pat. Nos. 5,964,295; 5,979,555; and 6,239,183, incorporated herein by reference.

Viscoelastic surfactants improve the fracturing (frac) fluid performance through the use of a polymer-free system. These systems offer improved viscosity breaking, higher sand transport capability, are more easily recovered after treatment, and are relatively non-damaging to the reservoir. The systems are also more easily mixed "on the fly" in field operations and do not require numerous co-additives in the fluid system, as do some prior systems.

The viscoelastic surfactants suitable for use in this invention may include, but are not necessarily limited to, non-ionic, cationic, amphoteric, and zwitterionic surfactants. Specific examples of zwitterionic/amphoteric surfactants include, but are not necessarily limited to, dihydroxyl alkyl glycinate, alkyl ampho acetate or propionate, alkyl betaine, alkyl amidopropyl betaine and alkylimino mono- or di-propionates derived from certain waxes, fats and oils. Quaternary amine surfactants are typically cationic, and the betaines are typically zwitterionic. The thickening agent may be used in conjunction with an inorganic water-soluble salt or organic additive such as phthalic acid, salicylic acid or their salts.

Some non-ionic fluids are inherently less damaging to the producing formations than cationic fluid types, and are more efficacious per pound than anionic gelling agents. Amine oxide viscoelastic surfactants have the potential to offer more gelling power per pound, making it less expensive than other fluids of this type.

The amine oxide gelling agents $RN^+(R')_2O^-$ may have the following structure (I):

where R is an alkyl or alkylamido group averaging from about 8 to 24 carbon atoms and R' are independently alkyl groups averaging from about 1 to 6 carbon atoms. In one non-limiting embodiment, R is an alkyl or alkylamido group averaging from about 8 to 16 carbon atoms and R' are independently alkyl groups averaging from about 2 to 3 carbon atoms. In an alternate, non-restrictive embodiment, the amidoamine oxide gelling agent is Akzo Nobel's Aromox APA-T formulation, which should be understood as a dipropylamine oxide since both R' groups are propyl.

Materials sold under U.S. Pat. No. 5,964,295 include ClearFRAC™, which may also comprise greater than 10% of a glycol. One preferred VES is an amine oxide. As noted, a particularly preferred amine oxide is APA-T, sold by Baker Oil Tools as SurFRAQ™ VES. SurFRAQ is a VES liquid product that is 50% APA-T and 40% propylene glycol. These viscoelastic surfactants are capable of gelling aqueous solutions to form a gelled base fluid. The additives of this invention may also be used in Diamond FRAQ™ which is a VES system, similar to SurFRAQ, sold by Baker Oil Tools.

The invention covers commonly known materials as Aromox APA-T manufactured by Akzo Nobel and other known viscoelastic surfactant gelling agents common to stimulation treatment of subterranean formations.

The amount of VES included in the fracturing fluid depends on at least two factors. One involves generating enough viscosity to control the rate of fluid leak off into the pores of the fracture, and the second involves creating a viscosity high enough to keep the proppant particles suspended therein during the fluid injecting step, in the non-limiting case of a fracturing fluid. Thus, depending on the application, the VES is added to the aqueous fluid in concentrations ranging from about 0.5 to 25% by volume, alternatively up to about 12 vol % of the total aqueous fluid (from about 5 to 120 gallons per thousand gallons (gptg); Si equivalent units have the same value and may be expressed in any convenient terms, e.g. liters per thousand liters, $m^3/1000\ m^3$, etc.). In another non-limiting embodiment, the range for the present invention is from about 1.0 to about 6.0% by volume VES product. In an alternate, non-restrictive form of the invention, the amount of VES ranges from 2 to about 10 volume %.

It is expected that the breaking compositions mentioned above may be used to reduce the viscosity of a VES-gelled aqueous fluid regardless of how the VES-gelled fluid is ultimately utilized. For instance, the viscosity breaking compositions could be used in all VES applications including, but not limited to, VES-gelled friction reducers, VES viscosifiers for loss circulation pills, fracturing fluids and other stimulation fluids, drilling operations, gravel pack fluids, viscosifiers used as diverters in acidizing, VES viscosifiers used to clean up drilling mud filter cake, remedial clean-up of fluids after a VES treatment (post-VES treatment), and the like. It is also expected that the well treatment microemulsion may also be used to clean surface equipment and downhole equipment that has been in contact with VES-gelled aqueous fluids. It is also expected that the well treatment microemulsion may be used when a fluid-loss additive is used within the VES-gelled fluid. Fluid-loss additives for VES fluids aid in lowering the fluid leak-off within the pores of a reservoir, in applications such as frac-packing. Non-limiting examples of fluid-loss additives include starches, calcium carbonate-starch mixtures, guar gum, gum acacia, alginates, biopolymers, polyglycolic acids, polylactic acids, mixtures thereof, and the like.

In one non-restrictive embodiment, for well remediation applications, the selected well treatment microemulsion is injected directly into the wellbore through the production tubing or through the use of coiled tubing or similar delivery mechanisms, again before, after or together with the VES-containing fluid. Once downhole, the well treatment microemulsion remedies drilling damage, fracturing fluid damage, water blocks and may also remove fines, asphaltenes and paraffins from the formation and wellbore. The well treatment microemulsion also serves to thin heavy hydrocarbons, alleviate water blocks and lower pore pressure in the formation. If paraffin accumulation is significant, methylethyl benzoate, methylpyrrolidone, d-limonene, or methylpyrrolidone and d-limonene or mixtures thereof may be used as solvents with a glycol ether.

The well treatment microemulsions herein may also be used in stimulation operations utilizing polymeric-viscosified fluids, such as borate crosslinked guar, zirconate crosslinked carboxymethyl guar, linear hydroxyethyl cellulose, and the like. In fracturing operations, proppant material can be added to the fracturing fluid containing the microemulsion before injection downhole. The microemulsion may also be used to decrease pressures due to various types of filter cakes during high pressure injection of gelled fluids into the wellbore.

A value of the methods and compositions herein is that a fracturing or other fluid can be designed to have better cleanup of the VES fluid from the fracture and wellbore. Better clean-up of the VES directly influences the success of a fracture treatment, which is an enhancement of the well's hydrocarbon productivity.

In order to practice the method of the invention, an aqueous fracturing fluid, as a non-limiting example, is first prepared by blending a VES into an aqueous fluid. The aqueous fluid could be, for example, water, brine, seawater, and the like. Any suitable mixing apparatus may be used for this procedure. In the case of batch mixing, the VES and the aqueous fluid are blended for a period of time sufficient to form a gelled or viscosified solution. The microemulsions may be added at the time the VES fluid is prepared, or alternatively, the microemulsion compositions herein may be added separately.

Propping agents are typically added to the base fracturing fluid after the addition of the VES. Propping agents include, but are not limited to, for instance, quartz sand grains, glass and ceramic beads, bauxite grains, walnut shell fragments, aluminum pellets, nylon pellets, and the like. The propping agents are normally used in concentrations between about 1 to 14 pounds per gallon (120-1700 $kg/m^3$) of fracturing fluid composition, but higher or lower concentrations can be used as the fracture design required. The base fluid can also contain other conventional additives common to the well service industry such as water wetting surfactants, non-emulsifiers, biocides, clay control agents, pH buffers, fluid loss additives, enzymes, and the like, which are not necessarily part of the microemulsion. As noted, in this invention, the base fluid can also contain other non-conventional additives which can contribute to the various functions described, and which are added for those purposes.

In a typical fracturing operation, the fracturing fluid of the invention is pumped at a rate sufficient to initiate and propagate a fracture in the formation and to place propping agents into the fracture. A typical fracturing treatment would be conducted by mixing a 20.0 to 60.0 gallon/1000 gal water (volume/volume—the same values may be used with any Si volume unit, e.g. 60.0 liters/1000 liters) amine oxide VES, such as SurFRAQ, in a 2% (w/v) (166 lb/1000 gal, 19.9 kg/m$^3$) KCl solution at a pH ranging from about 6.0 to about 8.0. The breaking components may be added after the VES addition, or in a separate step after the fracturing operation is complete or in some cases with the VES-gelled fluid.

In one embodiment, the method is practiced in the absence of gel-forming polymers and/or gels or aqueous fluid having their viscosities enhanced by polymers.

The present invention will be explained in further detail in the following non-limiting Examples that are only designed to additionally illustrate the invention but not narrow the scope thereof.

GENERAL PROCEDURE FOR EXAMPLES 1-16

To a blender were added tap water, 3 wt % KCl, followed by 3 vol % viscoelastic surfactant (WG-3L—Aromox® APA-T from Akzo Nobel). The blender was used to mix the components on a very slow speed, to prevent foaming, for about 30 minutes to viscosify the VES fluid. The following VES breaker chemicals were then added and mixed an additional 5 minutes: EXP-192L (45% bw solution of diammonium EDTA chelants), EXP-195L (36% bw sodium ascorbate solution), and EXP-190L (mixture of various trace metals with chelants to keep them stable in solution). Mixed samples were then placed into plastic bottles. Various components, e.g. hydrotropes, singly or together, in various concentrations, were then added to each sample, and the sample was shaken vigorously for 2 minutes. The samples were placed in a water bath at the indicated temperature and visually observed every 30 minutes for viscosity reduction difference between the samples. Since a goal of the research was to find a relatively rapid gel breaking composition, samples were only observed for 3 hours.

Viscosity reduction can be visually detected. Shaking the samples and comparing the elasticity of gel and rate of air bubbles rising out of the fluid can be used to estimate the amount of viscosity reduction observed. Measurements using a Fann 35 rheometer at 100 rpm can also be used to acquire quantitative viscosity reduction of each sample.

The attached Table II Examples 1-16 were tests performed to develop an additive to aid the "solubility" of the "altered VES molecules" that resulted from breaking a VES-gelled aqueous fluid with a metal ion/redox additive breaker system. By "altered" it is meant that the molecules were still surfactants and micelles formed, but the micelles had a spherical, rather than the rod- or worm-like structure that gave the increased viscosity. Each break test was broken aggressively (that is, broken very quickly using relatively large concentrations of breaker components) so that the amount of "altered VES" would be more than what could be kept in solution and much of the altered surfactant would then phase out of the aqueous phase and form an upper "surfactant liquid mass layer" on top of the mix water brine.

The metal ion-redox breaker system appears to degrade (alter) VES molecules into less water soluble surfactant molecules (that is, in one non-limiting explanation, it appears to change the Hydrophilic-Lipophilic Balance (HLB)). In the HLB, the lower the ratio (i.e. from 18:1 to 8:1) the less water soluble and more oil-soluble the surfactant becomes. The tests performed here were to evaluate various solvents and surfactants: the solvents investigated were to allow the altered VES to have another phase to be soluble within besides just water (with the solvent itself still being highly water soluble and uniformly distributed within the water), and the surfactants investigated were to help form stable micelle aggregations (but of a non-viscous type) that would be dispersed within the water (both the solvents and surfactants were a type of hydrotrope chemistry approach to resolve the problem).

As may be seen in Table II, the best performance was with solvents (like propylene glycol and ethanol), particularly the solvent-surfactant combinations (e.g. propylene glycol+alkyl glucoside+sodium dodecyl sulfate of Example 12–no phase separation). A couple of glycol ether (such as ethylene glycol monobutyl ether) compatibility tests were performed at elevated fluid temperatures to determine the effects on VES gel viscosity, and it was found that glycol ether (a potent solvent) in small concentrations is not detrimental to VES viscosity and can be used in the clean-up additive compositions herein.

TABLE II

Clean-up Additives For VES-Based Fluids with Metal Ion-Redox Breaker Systems

| Ex. | Temp. | Type & Amount Of Solubilizer-Hydrotrope | Influence On Metal-Redox Break Time | Amount Of Altered VES Phase Separation | Visual Appearance of Altered VES Phase Separation |
| --- | --- | --- | --- | --- | --- |
| 1 | 100° F. (38° C.) | 4.0 pptg SDS[1] | None | 95% | Clear dark amber liquid |
| 2 | 100° F. (38° C.) | 6.0 pptg SDS[2] | None | 90% | Clear amber liquid |
| 3 | 150° F. (66° C.) | 4.0 gptg NE-200E | Trace | 80% | Clear light amber liquid |
| 4 | 150° F. (66° C.) | 10.0 gptg NE-200E | Trace | 60% | Clear light amber liquid |
| 5 | 150° F. (66° C.) | 1.0 gptg EC-9555A | Trace | 60% | Clear light yellow liquid |
| 6 | 150° F. (66° C.) | 10.0 pptg LABS[3] | Moderate | 80% | Clear light yellow liquid |
| 7 | 150° F. (66° C.) | 40.0 gptg Ethanol | Enhanced Rate | 20% | Clear light yellow liquid |

TABLE II-continued

Clean-up Additives For VES-Based Fluids with Metal Ion-Redox Breaker Systems

| Ex. | Temp. | Type & Amount Of Solubilizer-Hydrotrope | Influence On Metal-Redox Break Time | Amount Of Altered VES Phase Separation | Visual Appearance of Altered VES Phase Separation |
|---|---|---|---|---|---|
| 8 | 150° F. (66° C.) | 10.0 gptg MPG | Trace | 85% | Clear light yellow liquid |
| 9 | 150° F. (66° C.) | 10.0 gptg MPG 8.0 pptg SDS[4] | None | 40% | Clear light yellow liquid |
| 10 | 150° F. (66° C.) | 20.0 gptg MPG 5.0 gptg AG-6206 | Trace | 0% | No phase separation |
| 11 | 150° F. (66° C.) | 10.0 gptg MPG 2.0 gptg AG-6206 8.0 pptg SDS[4] | Trace | 30% | Clear light yellow liquid |
| 12 | 150° F. (66° C.) | 20.0 gptg MPG 2.0 gptg AG-6202 8.0 pptg SDS[4] | Trace | 0% | No phase separation |
| 13 | 150° F. (66° C.) | 10.0 gptg MPG 20.0 gptg Ethanol 8.0 pptg SDS[4] | Trace | 10% | Clear trace yellow liquid |
| 14 | 150° F. (66° C.) | 10.0 gptg MPG 10.0 gptg Ethanol 2.0 gptg AG-6202 8.0 pptg SDS[4] | Slight | 0% | No phase separation |
| 15 | 150° F. (66° C.) | 10.0 gptg MPG 1.0 gptg DOS | Trace | 50% | Clear yellow liquid |
| 16 | 150° F. (66° C.) | 10.0 gptg MPG 10.0 gptg Ethanol 8.0 pptg SDS[4] 2.0 gptg DOS | Enhanced rate | 10% | Clear trace yellow liquid |

[1] 0.05 kg/m$^3$
[2] 0.07 kg/m$^3$
[3] 0.12 kg/m$^3$
[4] 0.10 kg/m$^3$

Definitions:
SDS = Sodium Dodecyl Sulfate
NE-200E = Baker Oil Tools multi-component demulsifier
EC-9555A = C12-C14 dimethylbenzene ammonium chloride
LABS = linear alkyl benzene sulfonate
MPG = monopropylene glycol
AG-6206 = Akzo Nobel alkyl glucoside surfactant
DOS = sodium dioctylsuccinate Examples 17-19 show formulations of other, alternate microemulsions herein that are expected to have utility.

EXAMPLE 17

An example of one redox breaker system based microemulsion:
1. 81.5 vol % water
2. 0.25 vol % EXP-192L (45% bw solution of diammonium EDTA chelants),
3. 2.0 vol % EXP-195L (36 wt % sodium ascorbate solution)
4. 0.25 vol % EXP-190L (mixture of various trace metals with chelants)
5. 5.0 vol % ethylene glycol monobutyl ether
6. 2.0 vol % AG-6206 (Akzo Nobel alkyl glucoside)
7. 4.0 vol % Witconate 1223L (Akzo Nobel sodium dodecylbenzene sulfonate)
8. 5.0 vol % d-Limonene

EXAMPLE 18

An example of one polyenoic acid breaker system based microemulsion:
1. 75.0 vol % soybean oil
2. 5.0 vol % monopropylene glycol
3. 6.0 vol % Span 80 (Uniqema sorbitan monooleate)
4. 1.0 vol % Tween 80 (Uniqema POE (20) sorbitan monooleate)
5. 5.0 vol % Witconate AOS (Akzo Nobel sodium $C_{14}$-$C_{16}$ olefin sulfonate)
6. 8.0 vol % water

EXAMPLE 19

An example of a second polyenoic acid breaker system based microemulsion:
1. 63.0 vol % salmon oil
2. 10.0 vol % methylethyl benzoate
3. 5.0 vol % Span 80 (Uniqema sorbitan monooleate)
4. 2.0 vol % Tween 80 (Uniqema POE (20) sorbitan monooleate)
5. 1.5 vol % AG-6206 (Akzo Nobel alkyl glucoside)
6. 8.0 vol % Witcolate 1247H (Akzo Nobel sodium $C_6$-$C_{10}$ alcohol ether sulfonate)
7. 0.2 vol % tocopherol
8. 10.3 vol % water Thus, it has been demonstrated that methods and compositions are provided for enhancing the cleaning up from aqueous treatment fluids gelled with viscoelastic surfactants (VESs). There are also provided compositions and methods for cleaning up VES-gelled fluids relatively quickly. Alternatively in another non-limiting embodiment there are provided methods and compositions that may be used internally (or externally) in VES-gelled fluids that would provide other additional benefits to improved clean-up.

In the foregoing specification, the invention has been described with reference to specific embodiments thereof, and has been demonstrated as effective in providing methods and compositions for cleaning up VES-gelled fluids, particularly VES-gelled aqueous fracturing fluids in one non-limiting embodiment. However, it will be evident that various modifications and changes can be made thereto without departing from the broader spirit or scope of the invention as set forth in the appended claims. Accordingly, the specification is to be regarded in an illustrative rather than a restrictive sense. For example, specific combinations of viscoelastic surfactants, breaker systems, viscosity reducing agents, solubilizing agents, desorption agents, water wetting agents, dispersing agents, autooxidation rate controllers or modifying agents, water hardness agents, demulsifier agents, and other components falling within the claimed parameters, but not specifically identified or tried in a particular composition or fluid, are anticipated to be within the scope of this invention.

What is claimed is:

1. A method for treating a subterranean reservoir comprising:
   pumping an aqueous fluid gelled with a viscoelastic surfactant (VES) into the subterranean reservoir; and
   pumping a microemulsion into the subterranean reservoir before, after, and/or simultaneously with pumping the VES-gelled aqueous fluid into the subterranean reservoir, where the microemulsion comprises:
      at least one viscosity reducing agent comprising at least one unsaturated fatty acid;
      at least one solubilizing agent;
      at least one desorption agent; and
      at least one water wetting agent.

2. The method of claim 1 where the microemulsion comprises:
   a solubilizing agent comprising a solvent;
   a desorption agent comprising a surfactant; and
   a water wetting agent comprising a co-surfactant.

3. The method of claim 2 where
   the solvent is selected from the group consisting of a glycol, a glycol ether, an alkyl ester, and combinations thereof;
   the surfactant is selected from the group consisting of an alkoxylated alcohol, an alkyl glucoside, an alkyl polysaccharide, an alkoxylated sorbitan ester, a sorbitan ester, and combinations thereof; and
   the co-surfactant is selected from the group consisting of an isethionate, a sulfosuccinate, an alpha olefin sulfonate, an alkyl sulfate, an alkyl sulfonate, an alkyl ether sulfate, an alkyl ether sulfonate, an alkyl aromatic sulfonate, and combinations thereof.

4. The method of claim 1 where the microemulsion further comprises an additional component selected from the group consisting of a dispersing agent, an autooxidation rate controller, a water hardness agent, a demulsifier agent, and combinations thereof.

5. The method of claim 4 where
   the dispersing agent comprises a co-solvent; and
   the water hardness agent comprises a chelant.

6. The method of claim 5 where
   the co-solvent is selected from the group consisting of alkyl pyrrolidones, alkyl carbonates, terpene, propylene carbonate, d-limonene, and combinations thereof;
   the autooxidation rate controller is selected from the group consisting of chloride salts, bromide salts, tocopherols, ascorbates, trienoics, pentaenoics, hexaenoics, trace metals, chelated trace metals, and combinations thereof;
   the chelant is selected from the group consisting of polyaspartates, iminodisuccinates, aminocarboxylic acids, organophosphates, polyacrylamides, and combinations thereof; and
   the demulsifier agent is selected from the group consisting of polymers with hydrophobic side groups attached to a hydrophilic polymer backbone, alkylated phenolic resins, polyol esters, and combinations thereof.

7. The method of claim 1 where a property is improved as a consequence of the presence of the microemulsion as compared to an identical method absent the microemulsion, where the property is selected from the group consisting of:
   cleaning up the VES-gelled aqueous fluid;
   increasing the rate of and/or total amount of VES-gelled aqueous fluid returned from the reservoir;
   reducing plating out of the VES molecules onto reservoir minerals;
   keeping the reservoir pore matrix minerals water wet;
   lowering the surface tension between water and the reservoir pore matrix minerals;
   preventing or removing water-blocks,
   preventing or correcting VES fluid incompatibility with reservoir crude oil;
   controlling leak-off of VES-gelled fluids into the reservoir;
   increasing the water solubility of VES molecules;
   increasing the water solubility and/or dispersability of altered VES molecules; and
   combinations thereof.

8. The method of claim 1 where the VES-gelled aqueous fluid further comprises a breaker system selected from the group consisting of:
   A. a composition in an amount effective to reduce the viscosity of the gelled aqueous fluid, the composition comprising:
      at least one metal ion source; and
      at least a second source selected from the group consisting of an organic redox agent source, an inorganic redox agent source, an organic hydrogenation-dehydrogenation source, and an inorganic hydrogenation-dehydrogenation source;
   B. a soap reaction product of a fatty acid with an alkali or alkali earth metal base, the soap reaction product being present in an amount effective to reduce the viscosity of the gelled aqueous fluid;
   C. an unsaturated fatty acid, further comprising heating the VES-gelled aqueous fluid to a temperature effective to cause the unsaturated fatty acid to produce products in an amount effective to reduce the viscosity of the gelled aqueous fluid; and
   D. combinations thereof.

9. A method for treating a subterranean reservoir comprising:
   pumping an aqueous fluid gelled with a viscoelastic surfactant (VES) into the subterranean reservoir;
   pumping a microemulsion into the subterranean reservoir before, after, and/or simultaneously with pumping the VES-gelled aqueous fluid into the subterranean reservoir such that the microemulsion and the VES-gelled aqueous fluid are substantially mixed, where the microemulsion comprises:
      at least one viscosity reducing agent comprising at least one unsaturated fatty acid;
      at least one solubilizing agent;
      at least one desorption agent; and
      at least one water wetting agent; and removing at least a portion of the VES-gelled aqueous fluid from the reservoir.

10. The method of claim 9 where the removal of the VES-gelled aqueous fluid is improved in at least one respect over an identical method not employing the microemulsion, the respect selected from the group consisting of more rapid removal of the VES-gelled aqueous fluid and more complete removal of the VES-gelled aqueous fluid.

11. The method of claim 9 where the microemulsion further comprises an additional component selected from the group consisting of a dispersing agent, an autooxidation rate controller, a water hardness agent, a demulsifier agent, and combinations thereof.

12. The method of claim 9 where the VES-gelled aqueous fluid further comprises a breaker system selected from the group consisting of:
A. a composition in an amount effective to reduce the viscosity of the gelled aqueous fluid, the composition comprising:
   at least one metal ion source; and
   at least a second source selected from the group consisting of an organic redox agent source, an inorganic redox agent source, an organic hydrogenation-dehydrogenation source, and an inorganic hydrogenation-dehydrogenation source;
B. a soap reaction product of a fatty acid with an alkali or alkali earth metal base, the soap reaction product being present in an amount effective to reduce the viscosity of the gelled aqueous fluid;
C. an unsaturated fatty acid, further comprising heating the VES-gelled aqueous fluid to a temperature effective to cause the unsaturated fatty acid to produce products in an amount effective to reduce the viscosity of the gelled aqueous fluid; and
D. combinations thereof.

13. The method of claim 9 where the amount of microemulsion mixed with the VES-gelled aqueous fluid ranges from about 0.025 to about 2.0 vol % based on the total fluid mixture.

14. A gelled aqueous fluid comprising:
water;
a viscoelastic surfactant (VES) in an amount effective to increase the viscosity of the water to form a VES-gelled aqueous fluid; and
a microemulsion comprising:
   at least one viscosity reducing agent comprising at least one unsaturated fatty acid;
   at least one solubilizing agent;
   at least one desorption agent; and
   at least one water wetting agent.

15. The gelled aqueous fluid of claim 14 where the microemulsion comprises:
a solubilizing agent comprising a solvent;
a desorption agent comprising a surfactant; and
a water wetting agent comprising a co-surfactant.

16. The gelled aqueous fluid of claim 15 where
the solvent is selected from the group consisting of a glycol, a glycol ether, an alkyl ester, and combinations thereof;
the surfactant is selected from the group consisting of an alkoxylated alcohol, an alkyl glucoside, an alkyl polysaccharide, an alkoxylated sorbitan ester, a sorbitan ester, and combinations thereof; and
the co-surfactant is selected from the group consisting of an isethionate, a sulfosuccinate, an alpha olefin sulfonate, an alkyl sulfate, an alkyl sulfonate, an alkyl ether sulfate, an alkyl ether sulfonate, an alkyl aromatic sulfonate, and combinations thereof.

17. The gelled aqueous fluid of claim 14 where the microemulsion further comprises an additional component selected from the group consisting of a dispersing agent, an autooxidation rate controller, a water hardness agent, a demulsifier agent, and combinations thereof.

18. The gelled aqueous fluid of claim 17 where
the dispersing agent comprises a co-solvent; and
the water hardness agent comprises a chelant.

19. The gelled aqueous fluid of claim 18 where
the co-solvent is selected from the group consisting of alkyl pyrrolidones, alkyl carbonates, terpene, propylene carbonate, d-limonene, and combinations thereof;
the autooxidation rate controller is selected from the group consisting of chloride salts, bromide salts, tocopherols, ascorbates, trienoics, pentaenoics, hexaenoics, trace metals, chelated trace metals, and combinations thereof;
the chelant is selected from the group consisting of polyaspartates, iminodisuccinates, aminocarboxylic acids, organophosphates, polyacrylamides, and combinations thereof; and
the demulsifier agent is selected from the group consisting of polymers with hydrophobic side groups attached to a hydrophilic polymer backbone, alkylated phenolic resins, polyol esters, and combinations thereof.

20. The gelled aqueous fluid of claim 14 where the VES-gelled aqueous fluid further comprises a breaker system selected from the group consisting of:
A. a composition in an amount effective to reduce the viscosity of the gelled aqueous fluid, the composition comprising:
   at least one metal ion source; and
   at least a second source selected from the group consisting of an organic redox agent source, an inorganic redox agent source, an organic hydrogenation-dehydrogenation source, and an inorganic hydrogenation-dehydrogenation source;
B. a soap reaction product of a fatty acid with an alkali or alkali earth metal base, the soap reaction product being present in an amount effective to reduce the viscosity of the gelled aqueous fluid;
C. an unsaturated fatty acid, further comprising heating the VES-gelled aqueous fluid to a temperature effective to cause the unsaturated fatty acid to produce products in an amount effective to reduce the viscosity of the gelled aqueous fluid; and
D. combinations thereof.

21. A gelled aqueous fluid comprising:
water;
a viscoelastic surfactant (VES) in an amount effective to increase the viscosity of the water and form a VES-gelled aqueous fluid; and
a microemulsion in an amount ranging from about 0.025 to about 2.0 vol % based on a combination of the VES-gelled aqueous fluid and the microemulsion, where the microemulsion comprises:
   at least one viscosity reducing agent comprising at least one unsaturated fatty acid;
   at least one solubilizing agent;
   at least one desorption agent; and
   at least one water wetting agent.

22. The gelled aqueous fluid of claim 21 where the microemulsion further comprises an additional component selected from the group consisting of a dispersing agent, an autooxidation agent, a water hardness agent, a demulsifier agent, and combinations thereof.

23. The gelled aqueous fluid of claim 21 where the VES-gelled aqueous fluid further comprises a breaker system selected from the group consisting of:
A. a composition in an amount effective to reduce the viscosity of the gelled aqueous fluid, the composition comprising:
   at least one metal ion source; and
   at least a second source selected from the group consisting of an organic redox agent source, an inorganic redox agent source, an organic hydrogenation-dehydrogenation source, and an inorganic hydrogenation-dehydrogenation source;
B. a soap reaction product of a fatty acid with an alkali or alkali earth metal base, the soap reaction product being present in an amount effective to reduce the viscosity of the gelled aqueous fluid;
C. an unsaturated fatty acid, further comprising heating the VES-gelled aqueous fluid to a temperature effective to cause the unsaturated fatty acid to produce products in an amount effective to reduce the viscosity of the gelled aqueous fluid; and
D. combinations thereof.

* * * * *